Patented Aug. 22, 1933

1,923,223

UNITED STATES PATENT OFFICE 1,923,223

MOTHPROOFING SUBSTANCES

Wilhelm Lommel and Heinrich Münzel, Leverkusen-Wiesdorf-on-the-Rhine, Germany, assignors to I. G. Farbenindustrie Aktiengesellschaft, Frankfort-on-the-Main, Germany No Drawing. Application December 5, 1930, Serial No. 500,420, and in Germany December 31, 1929

6 Claims. (Cl. 167—37)

The present invention relates to new mothproofing substances and to the materials liable to attack by moths rendered moth-proof by means of said substances.

It is known that wool and the like can be protected against attack by moths by means of barium salts; calcium salts do not display this action, from which it might be concluded that the action of the barium salts depends on their toxicity, while the calcium compounds are inoperative in consequence of their non-poisonous properties.

In accordance with the present invention materials liable to attack by textile pests, especially moths, such as wool, furs, feathers and the like are protected against attack by such textile pests by incorporating with said materials an inorganic or organic compound of strontium, especially strontium salts, although these compounds, like those of calcium, are not poisonous for the human body. When, for example, a fabric composed of a material liable to attack by moths, such as wool, is immersed in an aqueous solution of strontium nitrate, the concentration thereof being so adjusted that after centrifuging the fabric contains about 0.5–0.7% of the salt, it has become protected against attack by moths. Instead of the nitrate other compounds containing strontium can be used, such as for example, strontium chloride. which likewise, in very small quantities i. e. of less than 1% ensures complete protection against moths. Strontium salts from other inorganic or organic acids, such as sulfonic acids and their derivatives can also be used. When it is not desired to work in aqueous solutions but in other solvents, it will be advisable to select strontium compounds soluble therein as may be desirable in the treatment of furs. Thus, for example, for working in benzene solution some fatty acid salts, such as strontium oleate, which is readily soluble therein are suitable; for working with alcoholic solutions strontium acetate or strontium salicylate, for example, may be employed.

The treatment of the materials to be mothproofed can be carried out by any of the methods known for this purpose, for example, by spraying, dipping, or otherwise moistening it with the solutions. The strontium compounds used for these purposes have the advantage of being completely non-poisonous, stable and easily available.

The following example will illustrate our invention but without restricting it thereto:

Example.—The wool which is to be rendered moth-proof is treated with an aqueous solution containing 0.4% of strontium chloride $$(SrCl_2.6H_2O)$$

in such a manner that after centrifuging the wool 1% of the strontium chloride calculated on the weight of the wool remains, whereupon the wool is permanently protected against attack by moths.

We claim:

1. As a new moth-proofing substance a colorless strontium salt, being soluble either in water or in organic solvents, and which does not possess a poisonous anion.

2. As a new moth-proofing substance an inorganic colorless strontium salt, being soluble either in water or in organic solvents, and which does not possess a poisonous anion.

3. As a new moth-proofing substance the colorless strontium chloride, being easily soluble in water, and which does not possess a poisonous anion.

4. As a new moth-proofing substance an organic colorless strontium salt, being soluble either in water or in organic solvents, and which does not possess a poisonous anion.

5. As a new moth-proofing substance a colorless strontium salt of a carboxylic acid, being soluble either in water or in organic solvents, and which does not possess a poisonous anion.

6. As a new moth-proofing substance the colorless strontium oleate, being soluble in benzine, and which does not possess a poisonous anion.

WILHELM LOMMEL.
HEINRICH MÜNZEL.